United States Patent Office 2,951,756
Patented Sept. 6, 1960

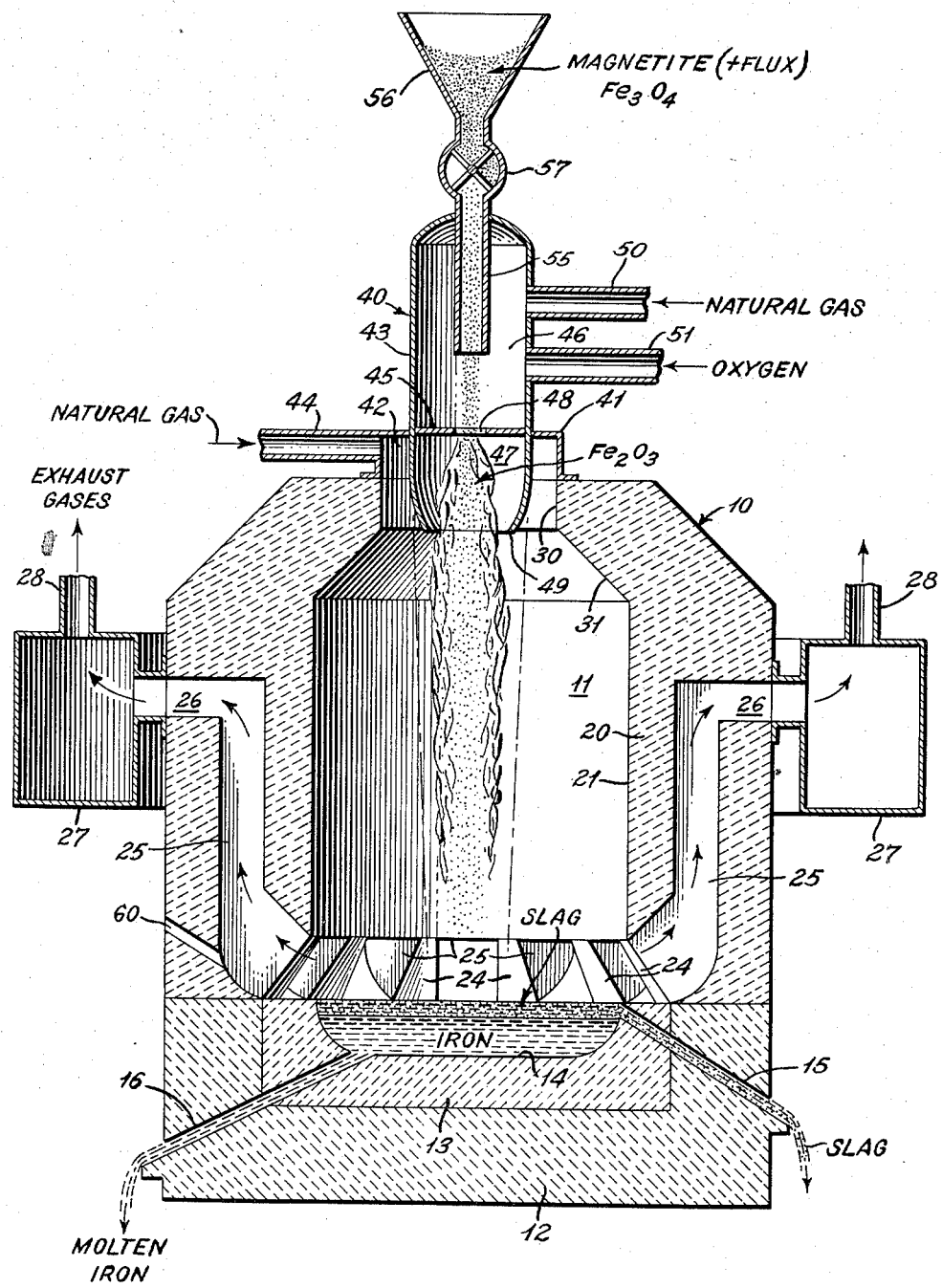

2,951,756
METHOD FOR JET SMELTING
Patrick Edgar Cavanagh, 320 Laird Blvd., Montreal, Quebec, Canada Filed May 16, 1958, Ser. No. 735,783

18 Claims. (Cl. 75—40)

This invention is directed to the treating of iron ore, and particularly magnetite ores, for the production of metallic iron therefrom. Specifically, the invention relates to the production of metallic iron from magnetite ores in finely divided particulate form wherein the ore particles are propelled in a flame during treating and injected into a furnace bath by impingement of the products of combustion upon the surface of such bath.

There have been a number of prior proposals for the smelting of particulate ore materials. In some of these prior smelting developments, where finely divided ore is used, the ore particles have been subjected to a reducing action with the particles suspended in a counterflow reducing gaseous medium. Such a counterflow procedure severely limits the rate of ore smelting utilizing any reasonably sized furnace and also necessitates providing substantial and expensive furnace structures to withstand the high temperatures encountered in operation of such a procedure. These limitations reduce the acceptability for practical application of these prior smelting proposals.

In a number of these prior art smelting developments, the reaction occurring in reducing the iron ore to metallic iron has been relatively slow due to the use of powdered coal for the combustible medium and for the reducing constituent. Of course, there are numerous other smelting proposals including the well known and principally used blast furnace technique. Discussion of the operation of the well known blast furnace need not be set forth. It may be pointed out, however, that the coke used in the blast furnace, among its functions, serves to form a supporting skeleton in the furnace of sufficient porosity to permit the gases to flow upwardly through the furnace. With relatively fine ores mixed with the requisite amount of limestone for flux purposes, the charge would pack together too tightly in the furnace to permit the necessary passage of gases.

In the light of the above ore smelting problems, the instant invention seeks as its primary object to achieve rapid treatment of iron ore in finely divided particulate form, with simplicity in the operating method and a minimum amount of bulky furnace structure being required.

It is thus an important object of this invention to provide an improved method for the treatment of magnetite ores in finely divided particulate form to produce metallic iron therefrom.

It is another important object of this invention to provide an apparatus wherein iron ore may be expeditiously treated while suspended and propelled in combustion products to produce metallic iron therefrom and insure separation of the metallic iron and slag from the gaseous constituents employed in treating the ore.

A further object of the instant invention is to provide for treatment of magnetite ore by initially subjecting such ore to an oxidizing action at a temperature of at least 2800° F. and preferably about 3500° F. to 3600° F. and thereafter to a reducing action to produce metallic iron therefrom.

It is also an object of this invention to provide an iron ore treating apparatus embodying a bath-type furnace having a downwardly directed burner assembly with the ore to be treated being introduced into intimate contact with the flame or products of combustion from such assembly for treatment and to be propelled and impinged upon the surface of the bath by such flame or products of combustion.

Another object of this invention is to provide a method and apparatus for treating iron ore in a bath-type furnace made in accordance with the above object wherein the ore is initially introduced into a first treating zone which is oxidizing in character and a second treating zone is provided between the first zone and the bath with a reducing agent being introduced into the second zone.

In accordance with the above object, it is a further object to provide a method and such a bath-type furnace apparatus wherein the reducing agent is preheated before its introduction into the second zone, with the apparatus providing a preheating chamber surrounding the burner.

An additional object of this invention is to provide in the ore treating method and apparatus of the above objects for efficient separation of gaseous constituents from the metallic iron and slag at the surface of the bath by withdrawal of the gases at substantially 180° to the direction of impingement of the gases upon the bath surface.

The above and other more specific objects of this invention will become readily apparent by reference to the following description of a specific embodiment of the invention taken in conjunction with the drawing. In the drawing the single figure is a diagrammatic sectional view of a furnace structure made in accordance with the instant invention and in which the method of such invention may be carried out.

Before discussing in detail the specific structure shown on the drawing, general reference may be had to the overall operational features of applicant's invention. In accordance with the invention, a mixture of predominantly magnetite ore and a suitable flux in finely divided particulate form is introduced into the center of a first treating zone of a downwardly directed combustion flame. The flux is preferably lime although ground limestone or known fluxes used in ore smelting may be employed. The flame is generated by the combustion of preferably natural gas and oxygen to provide the requisite high temperatures and rapid heating for the ore treatment. An excess quantity of oxygen is employed in the combustion so that the flame will be oxidizing in character.

The magnetite ore ($Fe_3O_4$) reacts in the oxidizing flame to combine with the excess oxygen to form hematite or ferric oxide ($Fe_2O_3$). This reaction is exothermic such that heat is liberated which, along with the heat of combustion of the fuel, produces rapid heating of the ore particles. Upon such rapid heating, decrepitation and cracking of the ore particles occurs to expose a greater surface area to the heating action and for the subsequent reducing action.

The mixture, including the shattered ore particles, with the iron in the form of ferric oxide, is propelled on with the products of combustion into a second treating zone. In this second zone, a reducing agent, preferably natural gas, is added to envelop the products of combustion and mixtures entrained therein, and pass downwardly concurrently therewith toward the surface of a molten iron and slag bath, against which the products of combustion impinge. The highly heated ore particles assist in cracking the natural gas into carbon monoxide and hydrogen. These constituents rapidly reduce the ferric oxide to metallic iron. The flux introduced with the ore combines with the gangue portions of the ore to form slag as is well known in the art.

The flame or products of combustion having the metallic iron and slag constituents suspended therein impinges upon the surface of the molten iron and slag bath such that the molten iron and slag constituents are injected into such bath. The gaseous constituents from the products of combustion and reducing agent are separated immediately adjacent the surface of the bath by their withdrawal outwardly and upwardly away from the bath surface. The molten iron and slag may be separately tapped from the bath.

Referring to the drawing, an ore treating furnace made in accordance with the instant invention is illustrated. It will be recognized that the particular structure shown is not intended as representing an accurate scaled representation of a furnace since several of the components are somewhat diagrammatically illustrated on the drawing.

The furnace structure includes a furnace unit 10 having walls, providing interiorly thereof a vertically elongated reducing chamber 11. The lower part of unit 10 includes a base 12 supporting a receptacle member 13 which has formed in the upper surface thereof a cavity 14 to receive and retain the molten iron and slag as it is produced. The base 12 and receptacle member 13 are provided with a suitable slag tap 15 and a molten iron tap 16. The iron and slag may be intermittently or continuously withdrawn through these taps as desired in operation of the furnace.

It will be appreciated that in operation of the furnace the receptacle member 13, retaining the bath of molten iron and slag, will continuously be subjected to high temperatures, such that progressive deterioration of such member will occur. Thus, the base closing the lower end of the furnace unit 10 is advantageously separable from the rest of the furnace to permit its removal for repair and replacement as may be necessary after prolonged use of the apparatus.

The unit 10 further includes a curtain wall 20 providing a generally cylindrical inner surface 21 which extends downwardly, terminating immediately above the molten iron and slag bath cavity 14. This inner surface 21 defines a major portion of chamber 11.

The curtain wall 20 is supported on pillars 24 which define the sides of exhaust gas passages 25 extending outwardly and upwardly from the lower end of curtain wall 20 to conduct gaseous exhaust constituents from the reducing chamber 11. These passages 25 extend upwardly on the outer side of curtain wall 20 and exit at 26 into a header 27 in which dust particles entrained in the exhaust gases may separate from the gases. The exhaust gases are led off from header 27 through conduits 28.

The upper end of furnace unit 10 has a cylindrical opening 30 communicating with chamber 11 by a downwardly flaring or tapering wall surface 31 which interconnects the lower end of opening 30 with the upper end of wall surface 21.

A burner assembly 40 is mounted on furnace unit 10 concentrically with respect to opening 30. As shown in the drawing, the burner assembly is supported on the upper end of unit 10 by a housing 41 which forms an annular duct 42 surrounding the casing 43 of the burner assembly. Housing 41 is provided with an inlet conduit 44 to introduce a reducing agent, such as natural gas, as will be described in more detail hereinafter. Thus, the reducing agent, in passing through duct 42, is preheated by contact with the hot wall of casing 43 and at the same time external cooling of the high temperature combustion chamber casing is provided.

The casing 43 of the burner assembly is divided by a partition member 45 into an upper mixing compartment 46 and a lower reaction chamber 47. The partition member 45 is provided with a central burner orifice 48. It will further be noted that the lower end of casing 43 defining reaction chamber 47 curves inwardly to provide a restricted outlet 49 at the lowermost end of the burner assembly leading into reducing chamber 11.

With reference to the design of the burner assembly, and particularly considering the design of the burner orifice 48, reaction chamber 47, and restricted outlet 49, the fluid flow velocity for proper operation of the ore treating process will be higher than the recognized flame propagation velocity for the fuel and oxygen mixture being burned. In order that the flame will not be "blown out" at the velocity necessary for the products of combustion in carrying out the ore treatment, "volume ignition" rather than a flame front must be provided in the reaction chamber 47. This can be accomplished by proper design of the burner assembly and the introduction of controlled turbulence as obtainable by the use of obstructions and shoulders in the fluid stream. With a properly proportioned turbulent burner reaction chamber, combustion can be at least 90% complete by the time the combustion products leave the reaction chamber.

As shown, fuel, such as natural gas, is introduced into mixing compartment 46 through a pipe 50, and a combusting supporting medium such as oxygen introduced into the mixing compartment through a pipe 51.

The burner assembly 40 is provided with a centrally disposed duct 55 at the upper end of casing 43 for the introduction of finely divided particulate iron ore to be treated. It will be noted that duct 55 discharges the ore particles immediately above the burner orifice 48 such that these particles pass downwardly through the orifice and into the flame existent below such orifice. Thus, the ore particles as introduced are centrally disposed and become completely enveloped in the flame.

The duct 55 leads from an ore supply hopper 56. A suitable gas lock 57 is shown disposed between hopper 56 and burner casing 43 to permit discharging the particulate ore into the burner without pressure existent in mixing compartment 46 escaping upwardly through duct 55 and hopper 56.

A passage 60 may be provided to recycle molten metallic iron to the iron bath as will be described hereinafter.

Having described structural details of a furnace embodying the features of the instant invention, reference may now be had to the ore treating process as carried out in such a furnace for producing molten metallic iron from such ore. In utilizing the heretofore described furnace, a supply of finely divided particulate ore of predominantly magnetite is introduced into hopper 56. The ore is mixed with a suitable flux, preferably lime, to combine in the separation of gangue portions from the ore being treated. The proportion of flux and its composition may be determined in accordance with the known principles of iron ore smelting to properly slag off silica, etc. contained in the particular ore being treated.

As is well known, magnetite ore may be upgraded or concentrated by magnetic separation processes. In the ore treating process of this invention, preferably a concentrated magnetite ore containing at least 60% iron and ideally less than 10% silica should be used in an essentially dry state. In the extremely rapid heating to which the ore in subjected in the reaction chamber, the use of a hard crystalline magnetite is particularly well suited for treatment in the process. With such an ore the rapid heating will effectively shatter the ore crystals into much smaller particles, exposing fresh surface to the action of the gases. Further, with regard to the ore and flux mixture introduced for treatment in accordance with this invention, the mixture should be of a size or be crushed to a size below 60 mesh, with not more than 15% below 325 mesh.

The particulate ore and flux is fed downwardly through gas lock 57 and duct 55 into the mixing compartment 46. Oxygen, preferably 90° pure, is introduced through pipe 51 to mix with natural gas introduced through pipe 50 as the mobile fuel. The ratio of oxygen to natural gas will be approximately 2 to 1 for stoichiometric combustion, with an excess of oxygen over this ratio being introduced to result in an excess of oxygen in the combustion products such that an oxidizing flame is produced.

The use of oxygen or oxygen enriched air to burn with the natural gas mobile fuel in chamber 47 has definite and special advantages in carrying out the process of the instant invention. By employing such a combustion supporting medium, higher temperatures in a very short distance of travel of the flame are produced than possible with ordinary air. For one thing, in view of the high nitrogen content of air, the total volume of combustion gases is relatively large where air provides the combustion supporting oxygen. This factor alone militates against achieving the high temperatures and rapid ore heating critical in carrying out ore treatment under this invention. Further, such higher volumes of products of combustion create a problem in separating the iron and slag particles from the exhaust gases such that more dust, etc. is carried out of the furnace through the exhaust gas ducts.

Actually, considering the high temperatures necessary in the process of this invention as will be discussed in more detail hereinbelow, it is near essential that oxygen or at least oxygen enriched air be employed in the fuel combustion. An overall economy in operating the ore treating process can result where relatively inexpensive natural gas is available and oxygen or oxygen enriched air is used. This stems from the fact that less fuel will be required to obtain the rapid high temperature heating of the ore than where the high volume of combustion products from air burned fuel are employed. The overall economy is further assisted where the high heat content in the exhaust gases is employed, as for example, in the production of oxygen for use in the combustion step.

The mixture including ore particles and flux, in passing from duct 55 through compartment 46, mixes with the combustible gases formed from the natural gas and oxygen and pass therewith through the burner orifice 48.

The combustible gases are ignited in reaction chamber 47. The actual flame temperature within this chamber is about 4200° F. to 4500° F. and rapidly raises the temperature of the ore particles, with increase in temperature being aided by the reaction of the magnetite ore with the excess oxygen in the combustion products which oxidizes the ferrosoferric oxide to hematite or ferric oxide. This reaction is exothermic, with the heat given off by such reaction further contributing to the rapid temperature rise of the ore particles to about 3500° F. to 3600° F. Whereas the flame temperature in compartment 47 is preferably between about 4200° F. to 4500° F., it is pointed out that the temperature of the ore particles must be at least 2800° F. for the reaction between the magnetite ore and excess oxygen to occur. Actually, unless the particle temperature is considerably above 2800° F. the rapid reaction time, which is a major advantage in carrying out the invention, is not achieved. Thus a particle temperature of about 3500° F. to 3600° F. is preferred. The importance of this exothermic reaction in the treatment of magnetite ore will be appreciated when it is recognized that the heat from this reaction may contribute about 20% of the heat required to reduce to molten metal the iron in, for example, a 66% Fe magnetic concentrate.

A particular advantage flowing from the extremely rapid heating of the ore particles results from the decrepitation and cracking of such particles occurring during this rapid heating. This shattering exposes substantially greater surface areas of the particles to the high temperature and excess oxygen in the flame such that the entire quantity of the particles is brought up to the requisite temperature in a minimum time as the flame and particles pass downwardly from reaction chamber 47 through outlet 49. The gaseous combustion products leave the burner at about 4,000° F.

The gaseous combustion products and mixture suspended therein are thus propelled downwardly into reducing chamber 11. A supply of natural gas as a reducing agent is introduced through conduit 44 into annular chamber 42. This chamber surrounds the lower end of burner casing 43, and accordingly, the reducing agent is preheated by contact with the hot wall of the burner casing exteriorly of reaction chamber 47. The reducing agent, in the form of natural gas, flows downwardly through opening 30 into reducing chamber 11. In such downward flow it envelops the combustion products and mixture passing through outlet 49 such that the two streams flow concurrently downwardly through reducing chamber 11. The added natural gas provides a reducing atmosphere to react with the ferric oxide in the suspended mixture to reduce it to metallic iron.

The use of natural gas as a reducing material is particularly advantageous in the operation of this invention since the ferric oxide present in the oxidizing flame passing from outlet 49 acts as a catalyst to crack the natural gas ($CH_4$) into hydrogen and carbon monoxide. These constituents in turn react with the ferric oxide in reducing it to metallic iron with water vapor and carbon dioxide also being produced. The water and carbon dioxide react endothermically with the gas remaining to form further hydrogen and carbon monoxide, resulting in a reduction in temperature at this stage in the process. Such reduction in temperature contributes to the possibility of utilizing a much simpler and more economical furnace design than where extremely high temperatures are encountered. The gaseous constituents, slag and metallic iron are propelled downwardly, by operation of the downwardly directed burner assembly 40, toward the surface of the molten bath in cavity 14. The gaseous constituents are given sufficient momentum by the burner operation such that the metallic iron and slag will be injected into the bath, resisting the tendency of the gases to carry these materials laterally and upwardly through passages 25 as the gases are conducted from the furnace.

It will be particularly noted that by the relationship of the burner to the passages 25 the direction of movement of the gaseous constituents is turned substantially 180° or reversed immediately adjacent the surface of the molten iron and slag bath. This serves to further promote separation of the gases from the metallic iron and slag. The exhaust gas flow through passages 25 should preferably be below two feet per second to minimize carry over of solid particles from the furnace chamber 11.

The downward velocity of the particles entrained in the flame or products of combustion must be at least 16 feet per second to insure adequate separation of the iron and slag suspended in the gases. At lower velocities the dust losses carried out with the gaseous constituents will be excessive. In order to accelerate these particles to the requisite velocity for impingement on the surface of the bath, the downward velocity of the gases in which the particles are entrained should be about 40 feet per second or greater. Of course, it will be recognized that the velocity of the products of combustion leaving the burner assembly may be in the order of 600 feet per second. Such combustion products expand rapidly immediately upon exit from the burner assembly, slowing down so that the average velocity may be as low as 40 feet per second to impart the requisite velocity to the entrained particles. There is no maximum firing velocity except that, depending on the design of the furnace, the faster firing velocities will require a longer furnace to provide enough time for the ore to be properly treated in passing through the furnace.

Considering the relation of the natural gas reducing agent to the firing velocity, it has been found that preferably the reducing agent, which envelops the flame or combustion products, should have a velocity less than the firing velocity and specifically in the order of between 15% and 80% of the firing velocity. Under such conditions of operation, the flame will assume a desirable cylindrical shape with the outer envelope of cooler reducing agent moving more slowly than the inner flame or products of combustion. Thus, the higher velocity flame or products of combustion will tend to draw in or inspirate the reducing agent thereinto to promote the reducing action of the iron oxide.

It has also been found as an important aspect of this invention that for optimum operating conditions, employing natural gas as the mobile fuel and as the reducing agent, it is critical that a ratio of natural gas reducing agent to natural gas mobile fuel be maintained between 1.5:1 and 2:1. For proper theoretical heat balance in the furnace operation, the ratio of reducing agent to mobile fuel should be maintained at about 1.62:1. If furnace operation is carried out substantially below this ratio, an inadequate quantity of reducing gas is provided to carry out the ore treating. On the other hand, if operation is carried out too far above this critical ratio, an excessive amount of heat is taken up in the furnace reactions, etc. so that the overall process is not properly carried to completion. It may be computed that utilizing this ratio of 1.62:1, a ton of metallic iron produced from magnetite ore (66% Fe) will require approximately 44,250 cubic feet of oxygen and a total of 55,800 cubic feet of natural gas. A theoretical heat and materials balance may be developed as follows:

*Approximate heat balance per ton of metal*

| In | | | Out | | |
|---|---|---|---|---|---|
| | MM b.t.u. | Percent | | MM b.t.u. | Percent |
| Gas—55,800 Cu. Ft. | 55.0 | 98.5 | Metal | 1.88 | 3.3 |
| Oxidation of magnetite | 0.60 | 1.0 | Slag | .31 | .5 |
| CO reduction | 0.06 | 0.1 | H₂ reduction | .24 | .4 |
| Fe₃C formation | 0.32 | 0.4 | Waste gas | 44.25 | 79.0 |
| | 55.98 | 100.0 | Losses | 46.68 9.3 | 16.6 |
| | | | | | 100.0 |

*Materials balance per ton of metal*

| In | | Out | |
|---|---|---|---|
| Primary gas cu. ft. | 21,300 | Metal at 4% C lbs. | 2,000 |
| Secondary gas cu. ft. | 34,500 | Slag lbs. | 405 |
| Oxygen cu. ft. | 44,250 | Exhaust gas cu. ft. | 168,500 |
| Ore at 66% Fe lbs. | 2,950 | | |
| Lime lbs. | 66 | | |

In initially starting the process, a molten metal bath is provided in cavity 14 upon which the downwardly propelled gases will impinge. As the process operates, slag and molten iron will accumulate in the bath, these constituents being continuously or periodically withdrawn through taps 15 and 16, respectively, as they are formed in the bath.

The bath is preferably maintained at a temperature of between 2800° F. and 3000° F. This temperature may be regulated within limits by adjustment of the distance between the surface of the bath and the hottest point of the flame. It will, of course, be recognized that the length of the furnace is dictated for a particular ore charging speed by the amount of travel required to heat the ore and, after the reducing agent is added, the distance necessary to get proper reduction of the iron oxide.

The removal of the last 10% of the oxygen from the iron oxide may present particular problems in the process of the instant invention. This final reduction can be effected in the molten bath by one of several methods. A portion of the molten metallic iron, preferably about 15% to 50% of the iron produced may be withdrawn from the bath, the carbon content thereof adjusted and the metal, still in a molten state, reintroduced into the bath through passage 60. Such recycling of a portion of the molten metallic iron with the carbon content appropriately adjusted causes the final reduction of the last 10% of the oxygen in the bath at a rate such that a furnace of given dimensions may be run at a substantially higher production capacity. The last 10% of oxygen may also be removed from the bath by the addition to such bath of coke. Otherwise, this oxygen may be removed by the addition to the burner of carbon, crushed to a size comparable to that of the ore and flux particles.

The regulation of the amount of recycled molten iron or carbon or coke added can be adjusted to provide a carbon content in the molten metallic iron in the bath of from 1% to 4%. It is thus possible to produce either a high carbon product or a low carbon product. Obviously the higher the carbon goes, the easier it is to obtain removal of the last 10% of oxygen from the iron oxide. The preferred compromise between carbon content of the product and removal of the last degree of oxygen from the bath is about 3% to 3.5%.

In order that the ore particles can be most completely reduced to metallic iron, the exhaust gases conducted from the furnace will remain reducing in character and contain some carbon monoxide and hydrogen. The exhaust gases can thus be burned to preheat the ore prior to its introduction into the furnace, or burned and used to produce steam which could be employed for the manufacture of oxygen in a standard oxygen compressor plant. A portion of the exhaust gases, containing carbon dioxide and water vapor can also be recycled into the flame, aiding in cracking of the natural gas. Also since the bath temperature is between 2800° F. and 3000 F., the exhaust gases will have a comparable temperature. This heat in the exhaust gases may be used as an energy source for the production of oxygen to be used in the process.

Although the description has been given hereinabove of using natural gas for the mobile fuel and reducing agent, obviously manufactured gas or other hydrocarbon gas could be substituted. The invention could, as an alternative to gas, be operated with kerosene, fuel oil or even with powdered coal. Since these latter materials, as fuels, have a longer burning time than gas, a larger furnace would be required to give the same production. Thus, in carrying out the instant invention, the use of these latter fuels are not preferred and have definite disadvantages as will be appreciated.

Further, air preheated at a temperature of about 1500° F. could be substituted for the oxygen introduced through pipe 51. As has been pointed out, the utilization of air to provide the combustion supporting oxygen would result in a lower maximum temperature, longer combustion time and greater gas volume due primarily to the high percentage of nitrogen in air. A furnace utilizing air could be designed although an operation of this type is not preferred as it has readily apparent drawbacks. Actually, considering the higher temperatures and operating speeds possible by burning with oxygen or oxygen enriched air, the operation costs are indicated to be higher where air is used to support combustion.

Whereas a specific embodiment of the invention has been illustrated and described herein, it will be readily recognized that within the scope of the hereinafter appended claims many variations and changes may be made, all falling within the purview of the instant invention. It will also be recognized that the method of this invention is capable of being carried out in a variety of different apparatuses in addition to the one specifically illustrated and described.

This application is a continuation-in-part of my prior copending application, "Means and Method for Jet Smelting," Serial No. 659,663, now abandoned, filed May 16, 1957.

What I claim:

1. A method of treating ore to produce metallic iron in a furnace having a reducing chamber and a molten metal bath beneath such chamber comprising the steps of burning a mobile fuel with the products of combustion of such burning directed downwardly to impinge upon the surface of the bath, introducing a mixture of finely divided iron ore and flux axially of the flame from the burning fuel to be propelled thereby and rapidly heat such mixture, thereafter enveloping the flame and the mixture suspended therein with a gaseous state reducing agent to flow concurrently therewith and reduce the iron oxide in the ore to metallic iron, and separating the gaseous constituents from the metallic iron and slag suspended therein by the impingement of the products of combustion upon the surface of the bath.

2. A method as recited in claim 1 wherein the enveloping reducing agent flows at a velocity of between 15% and 80% of the velocity of the flame.

3. A method of treating magnetite ore to produce metallic iron in a furnace having a reducing chamber and a molten metal bath beneath such chamber comprising the steps of burning a mobile fuel in an excess of oxygen to provide a downwardly directed flame zone which is oxidizing in character, introducing a mixture of finely divided predominately magnetite ore and flux into the flame to be propelled thereby and rapidly heat such mixture, thereafter introducing a reducing agent into intimate contact with the flame and mixture suspended therein to flow concurrently therewith and reduce the iron oxide in the ore to metallic iron, and impinging the products of combustion upon the surface of the bath to separate the gaseous constituents from the metallic iron and slag suspended therein.

4. A method as recited in claim 3 further including the step of preheating the reducing agent before introducing it into contact with the flame and mixture.

5. A method as recited in claim 3 wherein the flame is produced by burning natural gas with oxygen and the reducing agent is natural gas.

6. A method as recited in claim 5 wherein the ratio of oxygen to the natural gas mobile fuel is slightly in excess of 2:1.

7. A method as recited in claim 3 wherein the mobile fuel and the reducing agent are natural gas and the ratio of reducing agent to mobile fuel is between 1.5:1 and 2:1.

8. A method as recited in claim 3 wherein the mobile fuel and the reducing agent are natural gas and the ratio of reducing agent to mobile fuel is 1.62:1.

9. A method as recited in claim 3 wherein the reducing agent envelops the flame and mixture and flows at a velocity of between 15% and 80% of the velocity of the flame.

10. A method of treating magnetite ore to produce metallic iron in a furnace having a reducing chamber and a molten metal bath beneath such chamber comprising the steps of burning a mobile fuel in an excess of oxygen to provide a downwardly directed flame zone which is oxidizing in character, introducing a mixture of finely divided predominately magnetite ore and flux into the flame to be propelled thereby and rapidly heat such mixture, thereafter introducing a reducing agent into intimate contact with the flame and mixture suspended therein to flow concurrently therewith and reduce the iron oxide to metallic iron, impinging the products of combustion upon the surface of the bath to separate the gaseous constituents from the metallic iron and slag suspended therein, and conducting such gaseous constituents at an angle of substantially 180° to the direction of impingement of the products of combustion upon the bath to promote separation of the gaseous constituents from the iron and slag.

11. A method as recited in claim 10 wherein the gaseous constituents are conducted away from the surface of the bath at a velocity of not over two feet per second.

12. A method of treating magnetite ore to produce metallic iron in a furnace having a reducing chamber and a molten metal bath beneath such chamber comprising the steps of burning a mobile fuel in an excess of oxygen to provide a downwardly directed flame zone which is oxidizing in character and having a temperature of at least 2800° F., introducing a mixture of finely divided predominately magnetite ore and flux into the flame to be propelled thereby and to exothermically react with the excess oxygen to produce ferric oxide, thereafter introducing a reducing agent to the mixture as suspended in the flame to reduce the ferric oxide to metallic iron, and impinging the products of combustion upon the surface of the bath to separate the gaseous constituents from the metallic iron and slag suspended therein.

13. A method as recited in claim 12 wherein the mixture in the flame is heated to a temperature of about 3500° F. to 3600° F. before the mixture is subjected to the reducing action.

14. A method as recited in claim 12 wherein the bath temperature is at least 2800° F.

15. A method as recited in claim 12 wherein the velocity of the metallic iron and slag in the gaseous constituents impinge upon the surface of the bath at a velocity of at least 16 feet per second.

16. A method as recited in claim 12 wherein the mixture consists of particles not over about 60 mesh with less than 15% below about 325 mesh.

17. The method of flash smelting of iron which comprises crushing iron ore and a flux to below 60 mesh but less than 15% below 325 mesh, feeding the crushed ore and flux downwardly into a strongly oxidizing downwardly directed flame maintained so that the ore is entrained and carried concurrently with the flame and is heated to a temperature of about 3500° F. to 3600° F., providing a reducing zone wherein the flame in which the ore and flux is entrained is adjusted to strongly reducing conditions, separating the iron by impinging the flame in which the reduced ore is retained onto the surface of a bath of molten iron, withdrawing a material portion of the molten iron from the bath, adjusting its carbon content to about 3% to 3.5%, and returning the withdrawn portion to the bath to promote final reduction of and removal of remaining oxygen from the bath.

18. The method of claim 17 wherein the portion of molten iron withdrawn from the bath is between 15% and 50% of the molten iron in the bath.

References Cited in the file of this patent

UNITED STATES PATENTS

| | | |
|---|---|---|
| 1,317,295 | Hill | Sept. 30, 1919 |
| 1,490,012 | Kapteyn | Apr. 8, 1924 |
| 2,526,659 | Harman | Oct. 24, 1950 |
| 2,530,077 | Ramsing | Nov. 14, 1950 |
| 2,750,277 | Marshall | June 12, 1956 |